US011648742B2

(12) United States Patent
Tokarski

(10) Patent No.: US 11,648,742 B2
(45) Date of Patent: May 16, 2023

(54) METHODS FOR PREPARING FUNCTIONAL OPTICAL FILMS

(71) Applicant: Essilor International, Charenton-le-Pont (FR)

(72) Inventor: Zbigniew Tokarski, Woodstock, CT (US)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/624,516

(22) PCT Filed: Jun. 25, 2018

(86) PCT No.: PCT/EP2018/066986
§ 371 (c)(1),
(2) Date: Dec. 19, 2019

(87) PCT Pub. No.: WO2019/002220
PCT Pub. Date: Jan. 3, 2019

(65) Prior Publication Data
US 2020/0122418 A1  Apr. 23, 2020

(30) Foreign Application Priority Data

Jun. 26, 2017  (EP) ..................... 17305791

(51) Int. Cl.
*B29D 11/00* (2006.01)
*G02B 1/10* (2015.01)
(Continued)

(52) U.S. Cl.
CPC .... *B29D 11/0073* (2013.01); *B29D 11/00788* (2013.01); *B32B 37/12* (2013.01);
(Continued)

(58) Field of Classification Search
CPC .......... B29D 11/0073; B29D 11/00788; B32B 38/14; B32B 37/12; B32B 2038/168;
(Continued)

(56) References Cited

U.S. PATENT DOCUMENTS 9,034,457 B2*  5/2015  Su ........................... G03C 1/73
                                                        428/174
2004/0160569 A1*  8/2004  Leclaire ................. C03C 17/32
                                                        351/41
(Continued)

FOREIGN PATENT DOCUMENTS

WO  WO 2005/076044  8/2005
WO  WO 2006/101251  9/2006
(Continued)

OTHER PUBLICATIONS

International Search Report and Written Opinion Issued in Corresponding PCT Patent Application No. PCT/EP2018/066986, dated Oct. 25, 2018.

*Primary Examiner* — Francisco W Tschen
*Assistant Examiner* — Abhishek A Patwardhan
(74) *Attorney, Agent, or Firm* — Norton Rose Fulbright US LLP

(57) ABSTRACT

The disclosure provides post-production methods for functionalization of optical quality films produced by top tier manufactures. The methods disclosed herein allow for the incorporation of different additives into existing films.

12 Claims, 1 Drawing Sheet

(51) Int. Cl.
*C08J 7/043* (2020.01)
*B32B 37/12* (2006.01)
*B32B 38/14* (2006.01)
*B32B 38/16* (2006.01)

(52) U.S. Cl.
CPC ............ *B32B 38/14* (2013.01); *C08J 7/043* (2020.01); *G02B 1/10* (2013.01); *B32B 2038/168* (2013.01); *B32B 2310/0418* (2013.01)

(58) Field of Classification Search
CPC ........ B32B 2310/0418; B32B 37/1207; B32B 2037/1269; B32B 2310/0806; B32B 2551/00; C08J 7/043; C08J 7/0427; C08J 2301/12; C08J 2429/04; C08J 7/042; C08J 2401/12; G02B 1/10
See application file for complete search history.

(56) References Cited

U.S. PATENT DOCUMENTS

2012/0236255 A1\* 9/2012 Jiang ................... G02B 5/3033
351/159.61
2014/0104564 A1\* 4/2014 Bhalakia .................. G02C 7/12
351/159.56

FOREIGN PATENT DOCUMENTS

| WO | WO-2006101251 A1 * | 9/2006 | ............ B29C 55/08 |
| WO | WO 2008/033291 | 3/2008 | |
| WO | WO 2013/154695 | 10/2013 | |

\* cited by examiner

METHODS FOR PREPARING FUNCTIONAL OPTICAL FILMS

CROSS-REFERENCE TO RELATED APPLICATIONS

This application is a national phase application under 35 U.S.C. § 371 of International Application No. PCT/EP2018/066986 filed 25 Jun. 2018, which claims priority to European Patent Application No. 17305791.0 filed 26 Jun. 2017. The entire contents of each of the above-referenced disclosures is specifically incorporated by reference herein without disclaimer.

FIELD OF THE INVENTION

The present disclosure relates to methods for the incorporation of functional additives into existing high quality optical films.

BACKGROUND

Commercial optical-quality films, such as polycarbonate (PC) or cellulose triacetate (TAC), are customarily produced by a film extrusion process, in the case of PC, or by a solvent casting processes, in the case of either PC or TAC]. Films produced by the solvent casting method are resistant to high temperature and humidity and exhibit high optical transparency and isotropy over the visible light region. The solvent casting process includes the steps of preparing a dope solution, casting the dope solution onto a super-finished stainless steel belt, capturing and recovering the solvent, drying, annealing, stretching, and relaxing the formed film. A halogenated hydrocarbon solvent like dichloromethane is typically used for the dope solution, and the solvent is recovered using an expensive condensation process. In order to prevent escape of halogenated solvent into the atmosphere, the film is dried in an environmentally controlled chamber. The aforementioned steps require machinery that makes the optical-quality film solvent casting process prohibitively expensive for new entrants into this manufacturing process.

Incorporation of film additives typically occurs early during the solvent casting process. Additives are added to the dope solution formation stage, prior to the solution casting step. Some films suffer from poor color distribution or bleeding out of additives during solvent evaporation. Incorporation of film additives after film production may address distribution issues that arise during evaporation. There is a need in the industry for alternative, lower cost methods for incorporation of functional additives into optical quality films.

SUMMARY

The present disclosure addresses the need to provide functionalized films by combining the optical quality of films produced by top tier manufactures with the flexibility of incorporation of functional additives into existing films. The inventors have found that incorporation of dyes and other additives into optical films by co-migration with a solvent or by dispersion into extrudable resins produce optical quality films with uniform additive distribution and high reproducibility. The methods disclosed herein provide high quality, functionalized optical films at a fraction of the cost of alternative manufacturing processes.

In some aspects, a method for preparing a functionalized optical film comprises the steps of providing a first optical polymer film having a smooth surface and an exposed surface opposite the smooth surface, providing a solution comprising a solvent and a solute comprising at least one functional additive, applying the solution onto one of the smooth surface or the exposed surface of the first film to form a coated first film surface and, optionally, evaporating at least a portion of the solvent. The solution may optionally include at least one resin. In some aspects, at least a portion of the solute migrates into and becomes embedded below the first film surface. A second film having a smooth surface and an exposed surface opposite the smooth surface may be applied onto the coated first film surface to produce a laminate. Either the exposed surface or the smooth surface of the second film may contact the coated first film surface. The laminate may be incorporated into a larger laminate. The laminate or larger laminate may be formed into a curved wafer. The laminate, larger laminate, or curved wafer may be incorporated into an optical element, such as a lens.

The optical films have two distinct film surfaces, an exposed surface and a smooth surface. In some embodiments, the film smooth surface was formed by contact with a polished surface that transfers its smooth finish to a molten polymer or dope solution that is in contact with the polished surface. In some aspects, the polished surface is a polished belt, a polished roller, a polished insert, or a polished table.

The smooth finish is transferred to a film made from a molten polymer or dope solution that is in contact with the polished surface. In some aspects, the smooth surface has a surface roughness value Ra that is less than 0.1. In further aspects, the smooth surface has a surface roughness value Ra that is less than 0.05. In a particular aspect, the smooth surface has a surface roughness value Ra that is less than 0.01. The exposed film surface was open for solvent evaporation and exposed to the evacuation atmosphere. The smoothness of the exposed surface is less than that of the smooth surface that was in contact with the super polished belt. In some aspects, surface roughness Ra of the smooth surface is less than surface roughness of the exposed surface. In some embodiments, a laminate produced by the above-described method includes inwardly-facing first film and second film exposed surfaces, that is, the first and second film exposed surfaces are contacting the solute, resulting in a laminate with smooth outward-facing surfaces.

In some embodiments, a method for producing a functionalized optical film or laminate comprises the steps of providing a film or laminate, providing a functionalized adhesive comprising an adhesive component and at least one functional additive, and applying the functionalized adhesive onto the film or laminate surface to form an adhesive-coated functionalized film or laminate. The adhesive may be a solvent-based adhesive, a water-based adhesive, or a solvent-free adhesive including but not limited to non-reactive thermoplastic polyurethanes, reactive epoxies, and UV curable acrylates. In some embodiments, the adhesive is a low melt temperature cellulose ester resin, such as mono-substituted or di-substituted cellulose acetate butyrate. The adhesive may be applied to a film or laminate by a number of methods known to those of skill in the art, including but not limited to slot die, roll smooth, gravure roll, Mayer rod, knife over roll, comma roll, immersion, bead coating, curtain coating, flexible blade, dip & squeeze, hotmelt, reverse roll 3 roll pan, reverse roll 3 roll nip, levelon, slot die unsupported, slot die supported, 5 roll differential, 4 roll differential, 3 roll differential reverse, 3 roll flexo in register, offset reverse with applicator, offset forward with applicator, metering rod, polishing bar, forward gravure, micro gravure, reverse gravure, and reverse gravure pan. In some aspects an adhesive coated onto a release film such as waxed paper, carrier film, or other intermediate material and may subsequently be transferred from the release film to the target film, laminate, lens, or other substrate. The adhesive-coated functionalized film or laminate may be incorporated into a larger laminate or an optical element.

In some embodiments, a method for producing an optical article having a functionalized optical laminate comprises the steps of providing a film or laminate, providing a functionalized adhesive comprising an adhesive component and at least one functional additive, extruding the functionalized adhesive onto a film or laminate surface to form an adhesive-coated functionalized film or laminate, and incorporating the adhesive-coated functionalized film or laminate into an optical article.

In some aspects, a method for producing a functionalized film or laminate comprises the steps of casting a functionalized solution comprising a functional additive, a solvent, and optionally a resin, onto a carrier support film and evaporating at least a portion of the solvent. The resulting film is then transferred to a film or laminate to produce a functionalized film or laminate. The carrier support film may be foil, polycarbonate (PC), polyethylene terephthalate (PET), or other support films known those of skill in the art, and preferably includes a polish-finished release surface. The functionalized solution is preferably cast onto the polish-finished surface of the carrier support film.

In some aspects, an optical article comprising a functionalized optical film is prepared by providing a first film having a smooth surface and an exposed surface opposite the smooth surface, providing a solution comprising a solvent and a solute comprising at least one functional additive, applying the solution onto one of the smooth surface or the exposed surface of the first film to form a coated first film surface, and optionally, evaporating at least a portion of the solvent. At least a portion of the solute becomes embedded below the first film surface. The functionalized first film may be incorporated into an optical article. The functionalized first film may be combined with one or more additional films and subsequently incorporated into an optical article.

In some embodiments, an optical article comprising a functionalized optical laminate is prepared by providing a film or laminate, providing a functionalized adhesive comprising an adhesive component and at least one functional additive, extruding the functionalized adhesive onto a film or laminate surface to form an adhesive-coated functionalized film or laminate, and incorporating the adhesive-coated functionalized film or laminate into an optical article.

In some aspects, a method for producing an optical element comprises the steps of casting a functionalized solution comprising a functional additive, a solvent, and optionally a resin, onto a carrier support film and evaporating at least a portion of the solvent. The resulting film is then transferred to a film or laminate to produce a functionalized film or laminate. The carrier support film may be foil, polycarbonate (PC), polyethylene terephthalate (PET), or other support films known those of skill in the art, and preferably includes a polish-finished release surface. The functionalized solution is preferably cast onto the polish-finished surface of the carrier support film. The functionalized film or laminate may then be incorporated into a larger laminate or into an optical element. The carrier support film may be selected such that surface energies of the carrier film and solution are compatible.

Films can include polycarbonate-, acrylic-, nylon-, cellulose-based films, optical films made from (co)polymers or polymer blends used in the photographic film and digital display device industry including but not limited to polyamide (nylon), polyvinyl alcohol, cyclic olefin (co)polymers, aliphatic polyesters (e.g., polylactide), polycaprolactone, polyetherimide, polystyrene or, and other optical films known to those of skill in the art. The film thickness may vary depending on the film composition and/or a film's ability to thermoform into a desired shape. For example, the cellulose-based film triacetate cellulose (TAC) may be used at a preferred thickness ranging from about 80 to about 250 µm. A polycarbonate film may be used at a preferred thickness ranging from about 150 to about 350 µm. The thickness of a film may be adjusted in order to achieve a desired result. For example, a TAC or PC film having a thickness that is outside the preferred range above may be used if the particular application exhibits improved results with the selected thickness. A person of skill in the art is able to experiment and modify film thickness such that a desired result is achieved. Examples of functional additives include dyes, ultraviolet light absorbers, retardation regulators, stabilizers, antioxidants, tints, pigment, light filters, processing aids such as slip agents and release agents, plasticizers, (anti-) static dissipating agents, anti-fog additives, gel-formation-prevention aids, anti-blocking agents such as silicates, and other specialty additives known to those of skill in the art. Resins that may be used herein include but are not limited to polycarbonates, polyurethanes, polyamides, cellulose-based resins, olefin copolymers that may have hard block and soft block polymer regions (e.g., cyclic olefin copolymers), ether-ester copolymers, and thermoplastic elastomers (e.g., polyether block copolymers, polyamide block copolymers). Those skilled in the art are able to select resins having desired optical properties (e.g., optical distortions, clarity, toughness, durability, and processability). Resins are provided in a non-film form, e.g., in solution or as a melt.

"Optical article," according to the disclosure, is defined as a transparent or translucent object through which a person on one side of the optical article may visually perceive an object on the opposite side. Examples of optical articles include sunglasses, fashion lenses, non-prescription and prescription lenses, sport masks, face shields, goggles, and electronic display screens.

Surface roughness may be determined by methods known to those of skill in the art. A non-limiting example of a method for empirically determining surface roughness is profilometry. Profilometry involves using a contact or a non-contact profilometer to measure a surface profile and quantify its roughness. One example of a contact profilometer employs a diamond stylus that contacts a sample and moves across the sample surface. The sample surface roughness is detected by vertical displacement of the stylus as it travels over the sample surface. Examples of non-contact profilometers include laser triangulation, confocal microscopy, low coherence interferometry, and digital holography. In some aspects, haze correlates with, and is used to measure a film's surface roughness. Haze is the percentage of light transmitted through a film that is deflected more than 2.5° (degrees) from the direction of the incoming beam. Haze causes light passing through a film to scatter and results in a cloudy appearance or poor clarity of objects when viewed through the film. Haze can be empirically determined using a hazemeter or a spectrophotometer. One particular method for measuring haze is ASTM D 1003.

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

BRIEF DESCRIPTION OF THE FIGURES

In FIG. 3A, a functionalized thermal adhesive composition (Ply 2) is applied onto a laminate comprising a polar PVA film (Ply 4) and a TAC film (Ply 5). In FIG. 3B, the functionalized thermal adhesive composition (Ply 2) is applied onto a TAC film base layer (Ply 1). A second TAC film layer (Ply 3) is then applied onto the adhesive to produce a dual-TAC film laminate.

DETAILED DESCRIPTION

Figure 1:
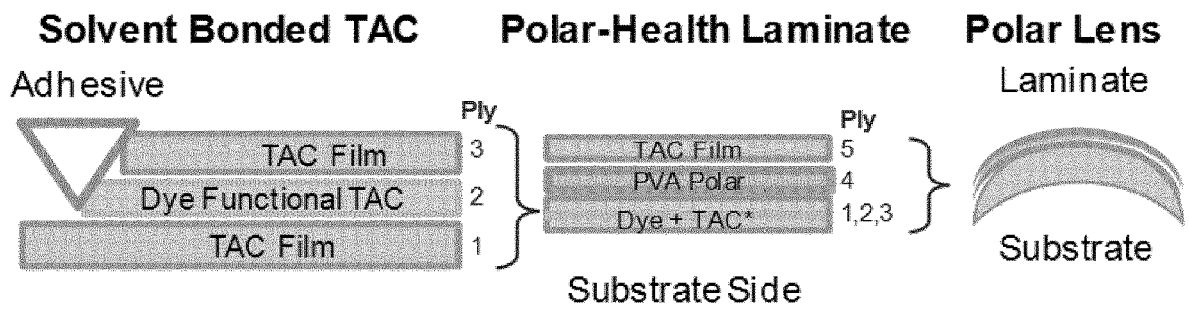
FIG. 1 depicts a dual-film laminate whose TAC film layers are bonded by a functionalized adhesive solution. The dual-film laminate is subsequently incorporated into a polar health laminate by combining the dual-film laminate with a light polarizing film/TAC film laminate. The polar health laminate is then incorporated into a light polarizing lens. The term 'polar' is defined as any film or multi-film structure that will either absorb, transmit, scatter, or reflect incident light vibrations wholly or partially in a planar, circular, or elliptical direction. Known structures in the art include, but not limited to, iodine or dichroic dye containing stretched films, nano spaced wire grid film, and combinations of polarizing and anisotropic retarding films. The physics of polarized light is well understood by those ordinary skilled in the art.

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

An objective of the present disclosure is to provide high-quality, functionalized ophthalmic films by incorporating one or more additives into mass-produced, high optical quality display films. The functionalized films may be incorporated into ophthalmic and plano lenses. A variety of different additives may be incorporated into the films, including light filters, tints, and other additives. The additives may be incorporated into existing films by co-migration with a solvent below the film's surface or by dispersion into extrudable resins. The methods disclosed herein employ high-quality films mass-produced by top tier film manufacturers as substrates and use semi-synthetic methods to produce high-quality functionalized optical films.

The vast majority of high quality optical films that are produced by solvent-casting methods are intended for display markets. By contrast, optical films manufactured for niche markets, e.g., ophthalmic and plano lenses, are produced on a smaller scale. Films produced by incorporating dyes, tints, or other additives into the dope solution are more costly and typically lower in quality as compared to mass-produced optical films used in the display industry. The methods disclosed herein employ mass-produced, high optical quality display films as scaffolds for incorporating the desired additives in shorter, limited quantity production runs.

High optical quality display films have two distinct film surfaces. The smoother surface is formed by contact with a highly-polished belt surface that transfers its smooth finish to the film surface during solvent casting. The opposite film surface is formed by exposure to the evacuation atmosphere and solvent evaporation.

The following examples employ cellulose-ester resin films (e.g., triacetate cellulose, TAC) as examples, but any optical film known to those of skill in the art may be employed. Films can include polycarbonate-, acrylic-, nylon-, cellulose-based films, optical films made from (co) polymers or polymer blends used in the photographic film and digital display device industry including but not limited to polyamide (nylon), polyvinyl alcohol, cyclic olefin (co) polymers, aliphatic polyesters (e.g., polylactide), polycaprolactone, polyetherimide, polystyreneor, and other optical films known to those of skill in the art. The term "DYE" as used below encompasses any functional additive, including but not limited to dyes, ultraviolet light absorbers, retardation regulators, stabilizers, antioxidants, tints, pigment, light filter, and other specialty additives for incorporation into a film or laminate. The star annotation (e.g., TAC*, DAC*) denotes a resin (triacetate cellulose, diacetate cellulose, or any other resin type) that was used either in solution, as a melt, or any incorporable form that is not a film. Some examples below employ an additional polar polyvinyl alcohol (PVA) film to impart polarity on the laminate and finished lens, but any other suitable functional film, including but not limited to an optical absorber, a filter, a clear spacer, or a reflector may be used. A polar PVA film is polyvinyl alcohol based light polarizer in which a polyvinyl alcohol film containing one or more dichroic dyes and/or iodine/iodide dyes was stretched during the manufacturing process to impart light polarizing properties on the film.

EXAMPLES

Example 1: Functionalized Films by Film Solvent Bonding

An adhesive solution comprising a functional additive and a solvent is used to bond two films. The adhesive solution may further comprise a resin. The resulting laminate may be incorporated into an optical article, or may be used to build larger laminates, which in turn may be incorporated into an optical article.

In the exemplary laminate depicted in FIG. 1, a TAC film is employed as the base layer (Ply 1). An adhesive solution comprising a functional additive (DYE), a resin (TAC*), and a solvent is prepared and applied as Ply 2 to the TAC film base layer (Ply 1). The adhesive solution is preferably applied to the non-polished surface of TAC film Ply 1. At least a portion of the adhesive solution solvent may be evaporated. A second TAC film is then applied as Ply 3 to the adhesive layer. The non-polished surface of TAC film Ply 2 is preferably contacted with the adhesive layer to produce a laminate with polished surfaces facing outward. Using the above notations, the resulting laminate is of the form TAC/DYE+TAC*/TAC.

In an alternative embodiment, an adhesive solution consisting of a functional additive (DYE) and a solvent is prepared. The adhesive solution does not include a resin. The adhesive solution is applied to the non-polished surface of TAC film Ply 1. At least a portion of the adhesive solution solvent may be evaporated. A second TAC film is then applied as Ply 3 to the adhesive layer. The films' non-polished surfaces are preferably in contact with the adhesive solution. The resulting laminate is of the form TAC/DYE/TAC.

Either of the functionalized three-ply laminates created above (TAC/DYE+TAC*/TAC or TAC/DYE/TAC) may be incorporated into larger laminates. In the exemplary embodiment depicted in FIG. 1, a polar PVA film is laminated onto the three-ply laminate. A subsequent TAC film is then laminated onto the polar PVA film. Either or both of the subsequently-applied layers may be incorporated as described above. That is, an adhesive solution comprising a functional additive, a solvent, and optionally a resin may be used to incorporate a functional additive into one or more of the subsequently-applied layers. In other embodiments, either or both of the subsequently-applied layers may be incorporated without a functional additive.

Either of the functionalized laminates described above may be incorporated into an optical article using methods known to those of skill in the art. In some embodiments, a film or laminate is inserted into a casting mold, a resin is added in front and/or behind film or laminate, and the resin is cured using increased temperature, ultraviolet light, e-beam, or a different energy source, or by allowing the resin to self-cure with the passage of time. In further embodiments, a film or laminate is inserted into an injection mold cavity and a resin is injected in front and/or behind the film or laminate. The resin may then be cured using the methods discussed above. In some aspects, a laminate can be used as a lens without having gone through a convention casting or injection molding process, and can be thermoformed and/or surface ground into an optical article. In further aspects, an adhesive may be applied to a film or laminate, followed by forming the film or laminate into a curved wafer which may then be adhered to the surface of a lens.

Example 2: Functional Films by Solution Coating

A coating solution comprising a functional additive and a solvent is used to coat and at least partially embed the additive into a film layer. The coating solution may further comprise a binder.

Figure 2:
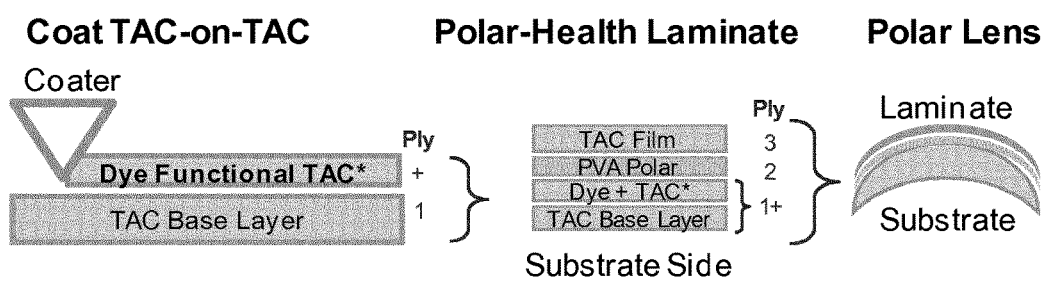
FIG. 2 depicts a TAC film that has been coated with a functionalized coating solution. The resulting functionalized film is incorporated into a laminate, which is subsequently incorporated into a polar lens.

A coating solution comprising a functional additive (DYE) a resin (TAC*), and a solvent is prepared. The coating solution is applied onto a film. At least a portion of the coating solution solvent may be evaporated. In the example depicted in FIG. 2, the film is a TAC film (Ply 1, TAC base layer). The coating solution (Ply 2) is preferably applied onto the non-polished surface of the film. The resulting coated film is of the form TAC/DYE+TAC*.

In an alternative embodiment, a coating solution comprising a functional additive (DYE) and a solvent is prepared and applied onto a film. The coating solution is preferably applied onto the non-polished surface of the film. At least a portion of the coating solution solvent may be evaporated. The resulting coated film is of the form TAC/DYE.

Either of the functionalized films created above (TAC/DYE+TAC* or TAC/DYE) may be incorporated into larger laminates. In the exemplary embodiment depicted in FIG. 2, a polar PVA film (Ply 2) is laminated onto the functionalized film. A subsequent TAC film (Ply 3) is then laminated onto the polar PVA film. Either or both of the subsequently-applied layers may be incorporated as described above. That is, an adhesive solution comprising a functional additive, a solvent, and optionally a resin may be used to coat and at least partially embed a functional additive into one or more of the subsequently-applied layers. In other embodiments, either or both of the subsequently-applied layers may be incorporated without a functional additive.

Either of the functionalized films or laminates described above may be incorporated into a lens using methods known to those of skill in the art, including but not limited to injection molding and thermoset casting.

Example 3: Functional Film by Solventless Film Thermal Bonding

A solventless thermal adhesive composition comprising a resin and at least one functional additive is applied onto a film. The film+adhesive composition may be incorporated into a laminate.

A functionalized thermal adhesive composition comprising a resin (DAC*) and at least one functional additive (DYE) is prepared. The resin may be a low melt temperature cellulose ester resin, e.g., mono-/di-substituted cellulose acetate butyrate.

The functionalized thermal adhesive composition is applied onto a laminate. In the embodiment depicted in FIG. 3A, the functionalized thermal adhesive composition (Ply 2) is applied onto a laminate comprising a polar PVA film (Ply 4) and a TAC film (Ply 5). The functionalized thermal adhesive composition is applied to the polar PVA film of the PVA/TAC laminate, however, the adhesive may be applied to the TAC film of the laminate. The resulting laminate is of the form DYE+DAC*/PVA-Polar/TAC. The exposed DYE+DAC* layer may be used to thermally bond the laminate to another film or laminate.

Figure 3:
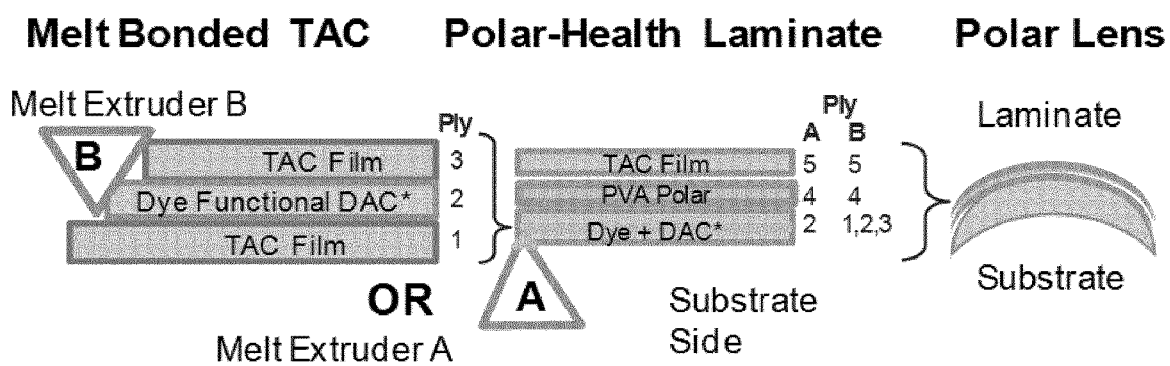
FIGS. 3A-B depict laminates produced by a solvent-free thermal bonding process.

In the alternative embodiment depicted in FIG. 3B, the functionalized thermal adhesive composition is applied onto a base film by melt extrusion. The functionalized thermal adhesive composition (Ply 2) is applied onto a TAC film base layer (Ply 1). The thickness of the TAC film base layer is preferably <80 µm. A second TAC film (Ply 3) is applied and thermally bonded onto the adhesive layer to produce a TAC/DYE+DAC*/TAC laminate. The thickness of the second TAC film is preferably <80 µm.

Either of the laminates may be incorporated into a larger laminate and may optionally be incorporated into a lens using methods known to those of skill in the art, including injection molding and thermoset casting.

Example 4: Functional Film by Casting on a Carrier Support Film

A functionalized solution comprising a functional additive, a resin, and a solvent is cast onto a carrier support film then transferred to a film or laminate.

Figure 4:
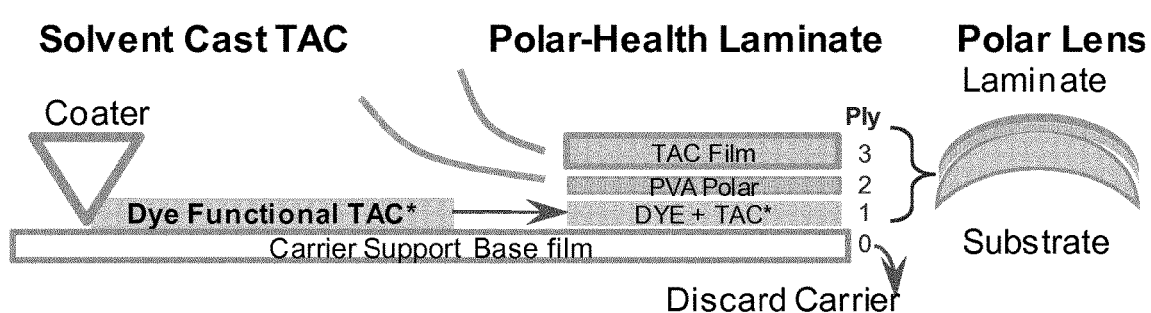
FIG. 4 depicts a solvent casting process for applying a functionalized solution to a film or laminate whereby a functionalized solution is coated onto a carrier support film then transferred to a film or laminate.

A functionalized solution comprising a functional additive (DYE), a resin (TAC*), and a solvent is prepared. In the embodiment depicted in FIG. 4, the solution (Ply 1) is coated onto a carrier support film (Ply 0). The carrier support film may be foil, polycarbonate (PC), polyethylene terephthalate (PET), or other support films known those of skill in the art, and preferably includes a polish-finished release surface. The functionalized solution is preferably cast onto the polish-finished surface of the carrier support film.

At least a portion of the functionalized solution solvent is evaporated and the resulting stand-alone film is then transferred to a film or laminate. In the embodiment depicted in FIG. 4, the stand-alone film (Dye Functional TAC*) is transferred to a PVA/TAC laminate. The carrier support film is then separated to produce a functionalized film or laminate. The functionalized film or laminate prepared by the method described above may be incorporated into a larger laminate, or incorporated into a lens using methods known to those of skill in the art, including injection molding, thermoset casting, or by adhesion to other films.

The claims are not to be interpreted as including means-plus- or step-plus-function limitations, unless such a limitation is explicitly recited in a given claim using the phrase(s) "means for" or "step for," respectively.

The invention claimed is:

1. A method for preparing a functionalized optical film comprising:
   providing a first film having a smooth surface having a surface roughness value Ra that is less than 0.1 µm and a non-polished surface opposite the smooth surface;
   providing a functionalized adhesive solution comprising a low-melt temperature cellulose resin, a solvent, and a solute comprising at least one functional additive comprising at least one of a dye, tint, pigment, and light filter;
   applying the functionalized adhesive solution onto the non-polished surface of the first film to form a coated first film surface;
   optionally, evaporating at least a portion of the solvent;
   combining the first film with a second film to produce a laminate comprising inwardly-facing first film and second film non-polished surfaces, wherein the first film and second film non-polished surfaces are contacting the solute, resulting in the laminate having smooth outward-facing surfaces; and
   combining a third film with the laminate to create a second laminate having the second film disposed between the first film and the third film; and
   incorporating the second laminate into an ophthalmic lens;
   wherein at least a portion of the solute co-migrates into the first film with the solvent and becomes embedded below the coated first film surface.

2. The method of claim 1, wherein the first film is an optical polymer film.

3. The method of claim 1, wherein combining the first film with the second film comprises applying the second film onto the coated first film surface, the second film having a smooth surface and the non-polished surface opposite the smooth surface.

4. The method of claim 3, wherein the non-polished surface of the second film is applied onto the coated first film surface.

5. The method of claim 1, wherein the first film is a triacetate cellulose film.

6. The method of claim 5, wherein the triacetate cellulose film has a thickness ranging from 80 µm to about 250 µm.

7. The method of claim 1, wherein the third film comprises a polar polyvinyl alcohol film.

8. The method of claim 1, further comprising, prior to combining said third film with said laminate, applying a second functionalized adhesive solution to the third film, the second functionalized adhesive solution comprising another low-melt temperature cellulose resin, another solvent, and another solute comprising one or more functional additives comprising the dye, the tint, the pigment, the light filter, or a combination thereof.

9. The method of claim 1, further comprising combining a fourth film with the second laminate to create a third laminate having the second film disposed between the first film and the third film and having the third film disposed between the second film and the fourth film, wherein incorporating the second laminate into the ophthalmic lens comprises incorporating the third laminate into the ophthalmic lens.

10. The method of claim 9, wherein the fourth film comprises the same material as the first film.

11. The method of claim 10, further comprising, prior to combining the fourth film with the second laminate, applying a third functionalized adhesive solution to the fourth film, the third functionalized adhesive solution comprising another low-melt temperature cellulose resin, another solvent, and another solute comprising one or more functional additives comprising the pigment, an ultraviolet light absorber, a retardation regulator, a stabilizer, an antioxidant, or a combination thereof.

12. The method of claim 1, wherein the first film is a polycarbonate film having a thickness ranging from 150 μm to 350 μm.

\* \* \* \* \*